US007003381B2

(12) United States Patent
Wakefield, II

(10) Patent No.: US 7,003,381 B2
(45) Date of Patent: Feb. 21, 2006

(54) INTEGRAL JOYSTICK DISPLAY FOR A POWDER DRIVEN WHEELCHAIR

(75) Inventor: Theodore D. Wakefield, II, Vermillion, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 10/681,933

(22) Filed: Oct. 9, 2003

(65) Prior Publication Data

US 2005/0080518 A1 Apr. 14, 2005

(51) Int. Cl.
*A61G 5/04* (2006.01)
*G06F 17/00* (2006.01)

(52) U.S. Cl. ............................ 701/1; 701/22; 180/907

(58) Field of Classification Search .................... 701/1, 701/32, 36, 22; 345/161; 180/65.8, 907
See application file for complete search history.

(56) References Cited

U.S. PATENT DOCUMENTS 4,820,966 A * 4/1989 Fridman ..................... 320/116
5,248,007 A * 9/1993 Watkins et al. ............ 180/9.32
5,274,311 A * 12/1993 Littlejohn et al. .......... 318/562
5,799,258 A * 8/1998 Fidanza et al. ............... 701/11

FOREIGN PATENT DOCUMENTS

GB 2244684 A * 12/1991
WO WO 95/05141 2/1995

OTHER PUBLICATIONS

DX Specialty Controls Master Remote; www.dynamic-controls.com; Product Description; Apr. 2003.*
"Specialty Control Modules for Pilot +", by Penny + Giles, brochure; Penny & Giles Drives Technology Division of Autronics Corporation, Bulletin No.: SK75001: Jan. 1999.

* cited by examiner

*Primary Examiner*—Michael J. Zanelli
(74) *Attorney, Agent, or Firm*—Calfee, Halter & Griswold LLP

(57) ABSTRACT

Apparatus of a power driven wheelchair for displaying operational parameters thereof comprises: a programmed controller operative to monitor a plurality of operational parameters of the wheelchair; a joystick unit coupled to the programmed controller; and a display screen integral to the joystick unit. The programmed controller is operative to interact with the joystick unit to display a user selected operational parameter of the plurality on the display screen of the joystick unit. In addition, a method of displaying operational parameters of a power driven wheelchair on a display screen integral to a joystick unit of the wheelchair comprises the steps of: monitoring a plurality of operational parameters of the wheelchair by a programmed controller; coupling the joystick unit to the programmed controller; utilizing the joystick unit to select an operational parameter of the plurality; and operating the programmed controller to interact with the joystick unit to display the selected operational parameter of the plurality on the display screen of the joystick unit.

20 Claims, 4 Drawing Sheets

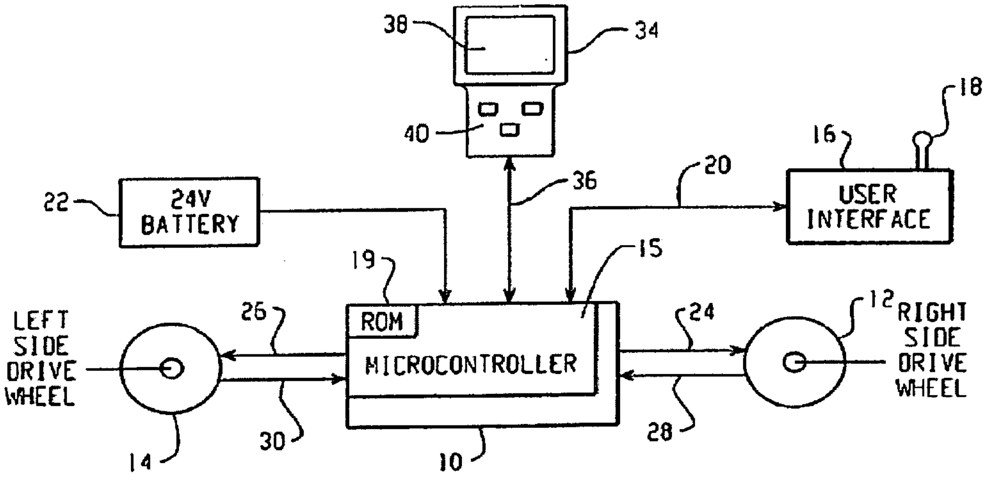
Fig. 1
PRIOR ART
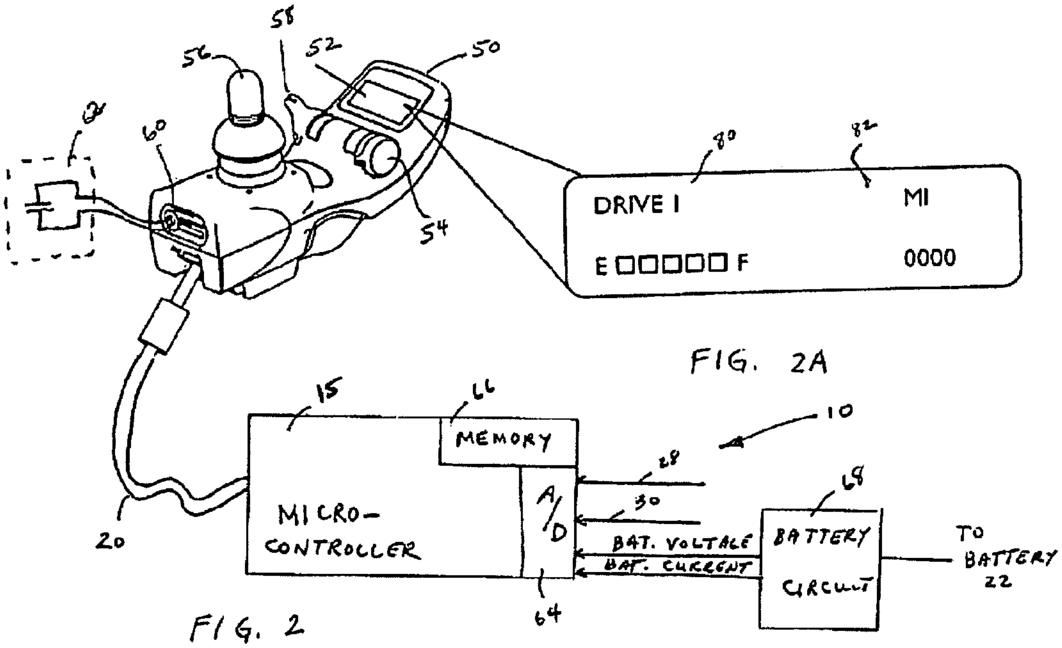
FIG. 2A
FIG. 2

INTEGRAL JOYSTICK DISPLAY FOR A POWDER DRIVEN WHEELCHAIR

BACKGROUND OF THE INVENTION

The present invention is directed to the field of power driven wheelchairs, in general, and more particularly to an integral joystick display therefor and a method of operating the same.

Power driven wheelchairs which may be of the type manufactured by Invacare Corporation of Elyria, Ohio, for example, generally include right and left side drive wheels driven by a motor controller via respectively corresponding right and left side drive motors, all of which being disposed on the wheelchair. An exemplary illustration of such a motor drive arrangement is shown in the schematic of FIG. 1. Referring to FIG. 1, a motor drive controller 10 which may be an Invacare MK IV™ controller, for example, controls drive motors 12 and 14 which are mechanically linked respectively to the right side and left side drive wheels of the wheelchair. The controller 10 includes a microcontroller 15 which may be programmed with a plurality of drive programs, each suited for a particular operating environment of the wheelchair.

A user interface 16 Which may include a joystick 18 and selection switches (not shown) operable by a user is also disposed on the Wheelchair in a convenient location to the user. The user interface 16 is generally interfaced to the microcontroller 15 over a two wire serial coupling 20 to permit the user to select a drive program appropriate for operating the wheelchair in its environment and to adjust the direction and speed of the wheelchair within the selected drive program. In the present example, a main program of the microcontroller 15 which may contain the plurality of drive programs is stored in a non-volatile memory 19, like a read only memory (ROM), for example, -which may be integrated into the microcontroller 15 or may be a separate component thereof.

The motor controller 10 is generally powered by a battery source 22, which may be 24 volts, for example, also disposed on the wheelchair. The drive motors 12 and 14 may be of the permanent magnet type and may be either a gearless, brushless AC motor or a brush type DC motor. The microcontroller 15 is interfaced and responsive to the user interface 16 to control drive signals 24 and 26 to motors 12 and 14, respectively, via a power switching arrangement configured in accordance with the motor type being driven. The power switching arrangement may be powered by the 24V battery 22. Thus, as the user adjusts the speed and direction of the wheelchair via the joystick of interface 16, appropriate drive signals 24 and 26 are controlled by motor controller 10 via microcontroller 15 to drive the motors 12 and 14 accordingly.

Motor controller 10 generally controls motor speed to the user setting utilizing a closed loop controller programmed in the microcontroller 15. Actual speed of each motor 12 and 14 may be derived from signals 28 and 30 respectively sensed therefrom. For example, for AC motors, a Hall Effect sensor may be disposed at the motor for sensing and generating a signal representative of angular position. The signals 28 and 30 are coupled to the microcontroller 15 which may be programmed to derive motor speed from a change in angular position for use as the actual speed feedback signal for the closed loop speed control of the motor. For DC motors, the voltage Va across the armature and armature current Ia may be sensed from each motor 12 and 14 and provided to the microcontroller 15 via lines 28 and 30, respectively. Microcontroller 15 may under programmed control derive the actual speed of each motor 12 and 14 from the respective voltage Va and current Ia measurements thereof for use as the speed feedback signal for the respective closed loop speed control of each motor 12 and 14.

In addition, interaction with the motor controller 10 is performed through a remote programmer 34 which may be electrically coupled to a port of the microcontroller 15 via signal lines 36, for example. Each remote programmer 34 may include a screen 38 for displaying interactive text and graphics and a plurality of pushbuttons 40 for communicating with the microcontroller 15 which is programmed to interact with the programmer 34. A dealer is generally provided with one or more remote programmers for rendering the wheelchair unique to the user's safe operating capabilities.

Present joystick interface units 16, like the joystick unit interfaced to Invacre's MK IV controller, for example, do not have an interactive display, but rather are only capable of displaying an indication of battery discharge which may be a line bar representative of the charge remaining on the battery 22, for example. It is desirable from both a user and dealer standpoint to have a display which may selectively display screen images of current operational parameters of the wheelchair. Display of such operational parameters of the wheelchair will enhance the ability to know when to replace and service certain components of the wheelchair.

The present invention provides such a display integral to a joystick unit which is already interfaceable to and operable with the microcontroller 15 for hands-on control to render a more convenient and less costly add-on display.

SUMMARY OF THE INVENTION

In accordance with one aspect of the present invention, apparatus of a power driven wheelchair for displaying operational parameters thereof comprises: a programmed controller operative to monitor a plurality of operational parameters of the wheelchair; a joystick unit coupled to the programmed controller; and a display screen integral to the joystick unit, wherein the programmed controller being operative to interact with the joystick unit to display a user selected operational parameter of the plurality on the display screen of the joystick unit.

In accordance with another aspect of the present invention, a method of displaying operational parameters of a power driven wheelchair on a display screen integral to a joystick unit of the wheelchair comprises the steps of: monitoring a plurality of operational parameters of the wheelchair by a programmed controller; coupling the joystick unit to the programmed controller; utilizing the joystick unit to select an operational parameter of the plurality; and operating the programmed controller to interact with the joystick unit to display the selected operational parameter of the plurality on the display screen of the joystick unit.

BRIEF DESCRIPTION OF THE DRAWINGS

FIG. 1 is a block diagram schematic illustration of an exemplary motor drive arrangement for a power driven wheelchair.

FIG. 2 is a block diagram illustration of an interactively operated integral joystick display suitable for embodying the principles of the present invention.

FIG. 2A is an exemplary screen image suitable for display on the integral joystick display.

DETAILED DESCRIPTION OF THE INVENTION

Figure 3:
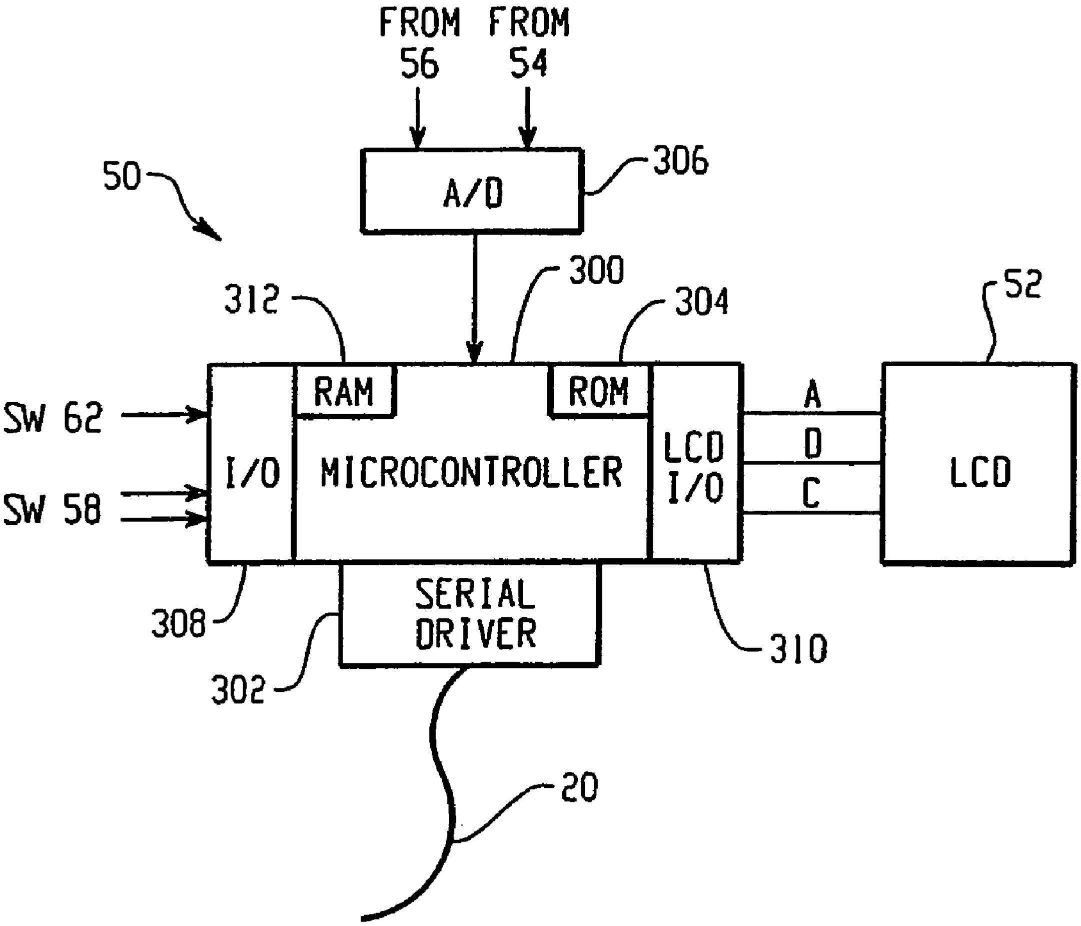
FIG. 3 is a block diagram schematic of an exemplary joystick unit with an integral display suitable for use in the embodiment of FIG. 2.

FIG. 2 is a block diagram illustration of an interactively operated integral joystick display suitable for embodying the principles of the present invention. Referring to FIG. 2, a joystick unit 50 having an integral image screen display 52, which may be a liquid crystal display (LCD), for example, interfaces with the microcontroller 15 utilizing signals serially transmitted over the two wire serial cable connection 20 to interactively control the operation of the wheelchair. More specifically, the joystick unit 50 includes a rotary knob 54 located at the front of the unit near the LCD 52 for setting the maximum speed of the wheelchair. In the present embodiment, the microcontroller 15 detects a clockwise rotation of the knob 54 via signals over cable 20 and increases the maximum speed of the wheelchair in response thereto. The microcontroller 15 also detects movement of a joystick 56, located at the middle of the unit 50, via signals over cable 20 and provides smooth control of the speed and direction of the wheelchair.

The microcontroller 15 further responds to movement of a drive select momentary switch 58 via signals over the cable 20 to control the wheelchair in a drive program selected by the user. The unit 50 additionally includes a one-eighth inch diameter phono plug or jack 60 located at the rear of the unit. In the present embodiment, a momentary switch 62, which may be an ability switch, for example, may be plugged into the jack 60 such that when the contacts of switch 62 are closed a representative signal is conducted over the cable 20 to the microcontroller 15. Usually, an ability switch includes a flexible stem and an integral switch which is normally open. Moreover, a bending of the flexible stem momentarily closes the integral switch thereof.

A block diagram schematic of an exemplary joystick unit 50 suitable for use in the embodiment of FIG. 2 is shown in FIG. 3. Referring to FIG. 3, the joystick unit 50 comprises a microcontroller 300 which may be of the type manufactured by Toshiba under the part no. TMPN3150B, for example. In the present embodiment, the Toshiba microcontroller 300 is designed for serial communication using a proprietary protocol developed by Echelon Corporation, for example. It has serial driver circuits 302 for interacting with the serial cable 20 and internal firmware stored in a read only memory (ROM) 304 executable to send and receive serial data over cable 20. Received serial data from cable 20 may be further processed by application firmware of the microcontroller 300 which may also be stored in ROM 304. The ROM 304 may be external to the microcontroller 300 or integrated therewith.

An external analog to digital converter (A/D) 306 may be used to read and digitize voltage signals from the joystick 56 and rotary knob 54 of the unit 50. The digitized signals are received by the microcontroller 300 which transmits them serially over cable 20. Also, input/output (I/O) circuits 308 of the microcontroller 300 are coupled to the switches 58 and 62 for reading the states thereof which may be also transmitted serially over cable 20 by the microcontroller 300. Additional I/O circuits 310 of the microcontroller 300 are coupled to the LCD 52 which is controlled by address (A), data (D), and control (C) lines of the microcontroller 300. At times, data may be temporarily stored in a scratch pad or random access memory (RAM) 312 of the microcontroller 300. Serial protocols, such as CAN and RS232, for example, may be used by the microcontroller 300 for serial communication.

In the present embodiment, the LCD 52 may be of the type manufactured by Hantronix under the part no. HDM12216L, for example. As will become more evident from the following description, all of the data that appears on the display 52 is determined by the microcontroller 15 and transmitted to the joystick unit 50 over cable 20. In the unit 50, the microcontroller 300 receives and translates the serial data from cable 20 and delivers the data directly to the LCD 52 for display in an appropriate screen image format. In the alternative, the microcontroller 300 may receive data from the microcontroller 15 via serial lines 20, process and/or store it in the RAM 312, then transfer it to the LCD 52 for display.

Returning to FIG. 2, the microcontroller 15 receives sensor signals 28 and 30 through an analog-to digital converter unit (A/D) 64 which may be part of the microcontroller 15. The A/D unit 64 may sample and digitize the sensor signals 28 and 30 and store the sampled digitized data in a memory 66 which may also be part of the microcontroller 15. In the present embodiment, the microcontroller 15 is operative under program control to derive from one or both of the sampled, digitized sensor signals: (1) a current speed of the wheelchair in parametric units of miles per hour (mph) or kilometers per hour (kmh) or both; (2) a trip distance traveled since the wheelchair was last powered on in parametric units of miles (MI) or kilometers (KM) or both; and (3) a total distance traveled by the wheelchair. All of the resultant derivations may be stored in designated registers of memory 66.

Still further, a battery circuit 68, which may be part of the motor controller 10, for example, may be connected to the battery 22 for monitoring certain operational parameters thereof, like voltage and current, for example. In the present embodiment, circuit 22 may generate signals representative of the current battery voltage and battery current being used, and provide such signals to the AID unit 64 wherein such signals may be sampled and digitized. The sampled, digitized voltage and current data of the battery 22 may be stored in memory 66. The microcontroller 15 is also programmed to derive from the battery voltage and current data trip battery consumption or battery capacity consumed since the wheelchair was last powered on in parametric units of amp-hours (AH). The derived and measured values may be stored in designated registers of memory 66.

Further yet, the battery circuit 68 may be controlled by the microcontroller 15 to perform a load test on the battery 22 from time to time and measure the current battery condition (BATT) based on each load test. In the present embodiment, the battery load test is performed automatically and without user intervention. For example, the microcontroller 15 may execute a routine which monitors the battery voltage, time and current load on the battery. During the routine, when the right sequence of events occurs during normal usage of the wheelchair, the load test data is captured and the display is updated as will become more evident from the description below. Factors in the sequence are: battery fully charged, a five minute rest period before the load test, a load on the batteries of 30–40 amperes, and the load is stable long enough for the data to be considered valid.

A voltage difference or drop between the rest battery voltage and the loaded battery voltage is read by the microcontroller 15 via A/D 64 and stored in a non-volatile portion of the memory 66, which may be EEPROM, for example. In the present battery load test routine, if the voltage drop under load is in the approximate range of 0–2.0V, the battery or batteries are considered good. If the voltage drop under load is in the range of 2–2.5V, the battery is considered poor, and if the voltage drop is more that 2.5V, the battery is considered bad. The resulting measured battery status of "GOOD", "POOR" or "BAD" is stored in memory 66 for display when selected as will become better understood from the following description.

In accordance with the present invention, certain operational parameters of the wheelchair, like current speed (speedometer), trip miles or kilometers (trip odometer), total distance in miles or kilometers (odometer), battery capacity consumed since the chair was last powered on (trip amphour meter), current battery voltage (battery volts), battery current being used (battery amps), and load test results (good, poor or bad), for example, may be selectively displayed on the integral joystick display 52 via communication over the serial communication cable 20.

An exemplary screen image displayed by the microcontroller 15 on the LCD 52 via microcontroller 300 of unit 50 is shown in FIG. 2A. Referring to FIG. 2A, in the present embodiment, the screen image is a two line (top and bottom) by twelve character length back lighted display which is separated into left side and right side image sections, 80 and 82, respectively. The drive program selected by the user is displayed on the top line of the left side image section 80. Displayed on the bottom line of the left side image section 80 is a battery discharge indicator comprising a line of five character blocks going from E (empty) to F (full). At full charge, all of the blocks are darkened or filled in. As the battery 22 becomes discharged, the furthest right blocks will progressively become unfilled or disappear a half block at a time until no blocks or segments appear between E and F. At this battery level, the word "RECHARGE" will appear on the second line of the left side image section 80.

To accomplish the foregoing described left side image screen display, the microcontroller 15 is pre-programmed to function in accordance with the following steps. The microcontroller 15 determines the drive program selected by the switch 58 of the joystick unit 50 and stored in memory 66, and sends serial data over cable 20 to render the selected drive program displayed on the top line of the left side screen image section 80 as shown in FIG. 2A. In addition, the microcontroller 15 calculates battery capacity from the battery voltage using a predetermined table of battery voltage vs. battery capacity relationships, which may be stored in memory 66, for example, and uses a time averaging filter algorithm to obtain a present battery capacity. Data of the present battery capacity is transmitted serially over the cable 20 to the joystick unit 50 to update the line block battery indicator displayed on the bottom line of the left side screen image section 80 as shown in FIG. 2A.

On the right side section 82 of the exemplary screen image of FIG. 2A, which is referred to as an information center, is displayed a selected one of the aforementioned operational parameters of the wheelchair on the top and bottom lines thereof. In the example image of FIG. 2A, a preprogrammed factory default odometer reading is displayed in the right side section 82 with the parametric unit of miles (MI) displayed on the top line and the total miles traveled by the wheelchair numerically displayed on the bottom line. It is understood that the total distance traveled by the wheelchair may also be displayed in kilometers (KM) just as well. As noted above, data representative of all of the operational parameters which are to be displayed are stored in memory 66 in parametric unit format.

The selection between English and metric units may be made with the programmer 34 described in connection with the embodiment of FIG. 1 and saved in a non-volatile portion of memory 66. In the present embodiment, the factory default selection is English, but in countries other than the U.S., like Canada, for example, metric units are preferred. The dealer can perform a change in metric units via the programmer 34 before delivering the wheelchair to the user.

A benefit of integrating the display 52 in the joystick unit 50 is to allow the user to interact via the microcontroller 15 with the display 52 through movement of the joystick 56 and/or other switches on the unit 50, for example. One of the user interactions is the selection of the operational parameter to be displayed as will become more evident from the following description. Thus, the microcontroller 15 is programmed to detect a command to enter a display select mode which is transmitted over cable 20 from the microcontroller 300 of joystick unit 50 to the microcontroller 15. While in such mode, the microcontroller 15 is further programmed to detect commands transmitted over cable 20 from the microcontroller 300 of unit 50 to determine the operational parameter selected by the user for display in the information center 82. And, in response, the microcontroller 15 is operative to send the associated operational parameter data serially over cable 20 to the microcontroller 300 of joystick unit 50 to render the units and value of the selected parameter displayed on the top and bottom lines of the information center 82 of the screen image as described above.

Figure 4:
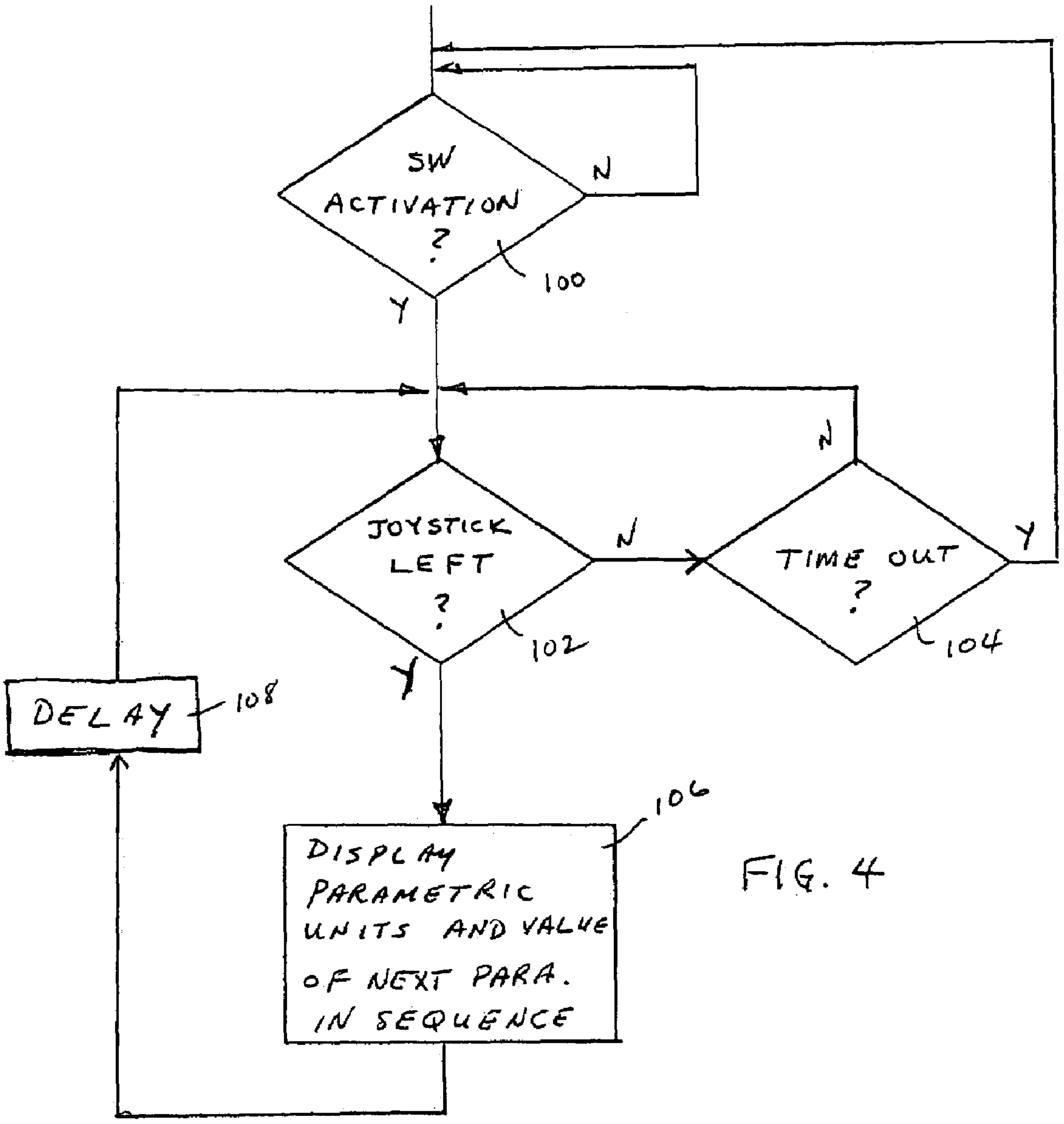
FIG. 4 is a software flowchart of an exemplary program suitable for use in the embodiment of FIG. 2.

An exemplary program suitable for use in the microcontroller 15 for interacting with the joystick unit 50 and display 52 is shown in the flowchart of FIG. 4 and typical screen images for the display 52 are shown in FIGS. 5A–5F. Referring to FIG. 4, in decisional block 100, the program monitors the cable 20, for example, to determine if a command is present to enter the display select mode. The microcontroller 300 of unit 50 may generate this command over cable 20 in response to an activation of the switch 62, for example. While the activation switch 62 is utilized to enter the display select mode in the present embodiment, it is understood that other switches may be utilized just as well without deviating from the principles of the present invention. Moreover, in the present embodiment, the microcontroller 15 may be default programmed to provide data to the unit 50 for displaying the wheelchair odometer reading such as shown in the screen image of FIG. 3.

When the display select mode is entered as determined by block 100, decision block 102 determines if the joystick 56 is moved to a predetermined position, like to the left, for example. In the present embodiment, the microcontroller 300 of unit 50 detects a joystick movement to the left and sends a command to the microcontroller 15 over cable 20, which command being identified by block 102. If no command is present after a predetermined time period as determined by decision block 104, then execution is returned to block 100 awaiting for the next command for entry into the display select mode. Otherwise, program execution continues at block 106 wherein data of the parametric units and value of an operational parameter next in a predetermined sequence is provided to the microcontroller 300 of unit 50 over cable 20 for display in the screen image of the display 52. For example, if speed of the wheelchair is the next parameter in the predetermined sequence, then the screen image exhibited in FIG. 5A will appear on display 52. Thereafter, the program is delayed for a short time period in block 108 and returned to block 102.

Figure 5A:
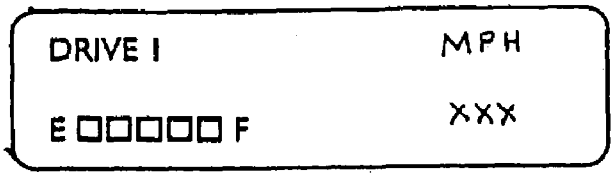
FIGS. 5A–5F are exemplary screen images suitable for display on the integral joystick display in a predetermined sequence.
Figure 5B:
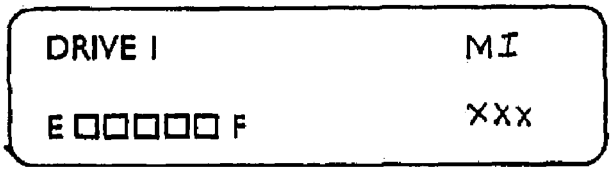
Figure 5C:
Figure 5D:
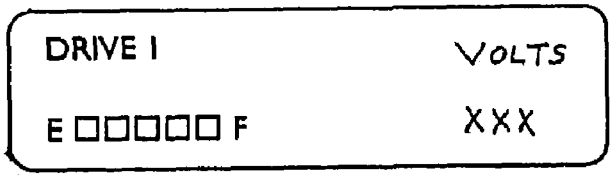
Figure 5E:
Figure 5F:
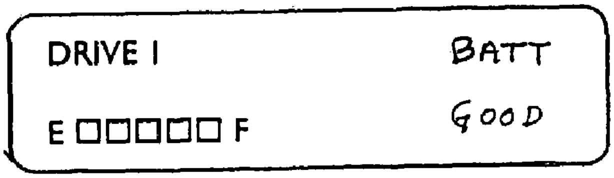

If in block 102, it is identified that the joystick 56 remains in the left position, then data of the operational parameter next in sequence is again provided to the microcontroller 300 of unit 50 for display in the information center of display 52. If the next parameter is trip odometer, then the screen image will appear as shown in FIG. 5B. So long as the joystick 56 is maintained in a left position, data will be provided by the microcontroller 15 to the microcontroller 300 of unit 50 to render a scrolling of the screen image of display 52 through the various operational parameters like trip-amp hour meter, battery volts, battery current, and load test results, for example, as shown in the screen images of FIGS. 5C through 5F, respectively. During scrolling, each operational parameter screen image remains displayed for the time period set in the delay block 108 which may be on the order of two seconds, for example. Whenever, the user observes the desired parameter on the display 52, he or she may move the joystick 56 to a position away from the left position which will be identified in block 102. Thereafter, program execution will return to block 100 via blocks 102 and 104 and the current screen image will remain until re-entry into the display select mode by the user. During display of the selected parameter, it will be updated in value by the microcontroller 15 in a timely fashion.

While the present invention has been described herein above in connection with one or more embodiments, it is understood that such description is presented by way of example with no intent of limiting the invention in any way. Rather, the invention should be construed in breadth and broad scope in accordance with the recitation of the claims appended hereto.

What is claimed is:

1. Apparatus of a power driven wheelchair powered by a battery for displaying operational parameters of said battery, said apparatus comprising:

- a programmed controller operative to monitor a plurality of operational parameters of said wheelchair battery;
- a joystick unit coupled to said programmed controller; and
- a display screen integral to said joystick unit, wherein said programmed controller being operative to interact with said joystick unit to display a user selected battery operational parameter of said plurality on said display screen of said joystick unit.

2. The apparatus of claim 1 wherein the joystick unit is operative to accommodate user selection of a battery operational parameter of the plurality and to communicate the user selection to the programmed controller.

3. The apparatus of claim 2 including a memory coupled to said programmed controller for storing data representative of the monitored battery operational parameters; and wherein the programmed controller is operative in response to the user selection from the joystick unit to access data representative of said user selected battery operational parameter from said memory and to communicate said accessed data to the joystick unit for display on the display screen.

4. The apparatus of claim 2 wherein the joystick unit comprises a joystick operable by a user to a predetermined position to select a battery operational parameter for display on the display screen of the joystick unit.

5. The apparatus of claim 4 wherein the joystick unit is operative in response to movement of the joystick to said predetermined position to communicate a second signal to the programmed controller; and wherein the programmed controller being responsive to the second signal to communicate to the joystick unit data representative of a next battery operational parameter in a predetermined sequence of battery operational parameters for display on the display screen of the joystick unit.

6. The apparatus of claim 5 wherein the programmed controller is responsive to the second signal when in a display select mode.

7. The apparatus of claim 5 wherein the programmed controller continues to communicate to the joystick unit data representative of the next battery operational parameter of the sequence at a predetermined rate in response to the second signal.

8. The apparatus of claim 1 wherein the user selected battery operational parameter of the plurality is displayed on the display screen of the joystick unit in parametric units.

9. The apparatus of claim 1 wherein the display screen is operative to display images in a split screen format; and wherein the user selected battery operational parameter is displayed in one region of the split display screen.

10. The apparatus of claim 9 wherein a battery discharge indicator is displayed in the other region of the split display screen.

11. The apparatus of claim 1 including a serial communication cable for coupling the joystick unit to the programmed controller to accommodate serial data communication therebetween.

12. The apparatus of claim 1 wherein the programmed controller comprises a microcontroller.

13. Method of displaying operational parameters of a battery that powers a power driven wheelchair on a display screen integral to a joystick unit of said wheelchair, said method comprising the steps of:

- monitoring a plurality of operational parameters of said wheelchair battery by a programmed controller;
- coupling the joystick unit to said programmed controller;
- utilizing said joystick unit to select a battery operational parameter of said plurality; and
- operating said programmed controller to interact with said joystick unit to display said selected battery operational parameter of said plurality on said display screen of said joystick unit.

14. The method of claim 13 including the steps of:

- storing data representative of the monitored battery operational parameters in a memory coupled to the programmed controller;
- communicating a selection signal from the joystick unit to the programmed controller; and
- operating the programmed controller to respond to the selection signal to access data representative of the selected battery operational parameter from said memory and to communicate said accessed data to the joystick unit for display on the display screen.

15. The method of claim 13 including operating the programmed controller to respond to an activation signal to enter a display select mode of operation.

16. The method of claim 13 including operating a joystick of the joystick unit to a predetermined position to select a battery operational parameter for display on the display screen of the joystick unit.

17. The method of claim 16 including the steps of: operating the joystick unit to communicate a selection signal to the programmed controller in response to movement of the joystick to the predetermined position; and operating the programmed controller to respond to the selection signal to communicate to the joystick unit data representative of a next battery operational parameter in a predetermined sequence of battery operational parameters for display on the display screen of the joystick unit.

18. The method of claim 17 including operating the programmed controller to respond to the selection signal when in a display select mode.

19. The method of claim 17 including operating the programmed controller to continue to communicate to the joystick unit data representative of the next battery operational parameter of the sequence at a predetermined rate in response to the selection signal.

20. The method of claim 13 including displaying the selected battery operational parameter on the display screen of the joystick unit in one region of a split screen format.

* * * * *